(12) United States Patent
Harriman et al.

(10) Patent No.: US 11,361,093 B2
(45) Date of Patent: Jun. 14, 2022

(54) DATA RELEASE CONTROL BASED ON AUTHENTICATION AND LINK PROTECTION

(71) Applicant: Intel Corporation, Santa Clara, CA (US)

(72) Inventors: David J. Harriman, Portland, OR (US); Ioannis T. Schoinas, Portland, OR (US); Kapil Sood, Portland, OR (US); Raghunandan Makaram, Northborough, MA (US); Yu-Yuan Chen, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 16/367,204

(22) Filed: Mar. 27, 2019

(65) Prior Publication Data

US 2019/0220617 A1 Jul. 18, 2019

Related U.S. Application Data

(60) Provisional application No. 62/778,807, filed on Dec. 12, 2018.

(51) Int. Cl.
*G06F 21/62* (2013.01)
*G06F 21/64* (2013.01)

(52) U.S. Cl.
CPC .......... *G06F 21/6218* (2013.01); *G06F 21/64* (2013.01)

(58) Field of Classification Search
None
See application file for complete search history.

(56) References Cited

U.S. PATENT DOCUMENTS

| | | | | |
|---|---|---|---|---|
| 2009/0291686 | A1* | 11/2009 | Alpert | H04W 36/0085 455/436 |
| 2014/0020072 | A1* | 1/2014 | Thomas | H04L 63/102 726/7 |
| 2014/0024314 | A1* | 1/2014 | McCormack | H04W 52/0229 455/41.2 |
| 2018/0183581 | A1 | 6/2018 | Elbaz et al. | |
| 2019/0052617 | A1 | 2/2019 | Chen et al. | |
| 2019/0220601 | A1 | 7/2019 | Sood et al. | |
| 2019/0281025 | A1 | 9/2019 | Harriman et al. | |

OTHER PUBLICATIONS

IEEE Computer Society, "IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications" IEEE Standards Association, IEEE Std 802.11, Dec. 7, 2016 (154 pages).

(Continued)

*Primary Examiner* — Brandon Hoffman
(74) *Attorney, Agent, or Firm* — Alliance IP, LLC

(57) ABSTRACT

First data is stored. A request for the first data is received from a communication device over a link established with a communication device. An access control engine comprising circuitry is to control access to the first data to the communication device based on an authentication state of the communication device and a protection state of the link.

17 Claims, 10 Drawing Sheets

(56) References Cited

OTHER PUBLICATIONS

IEEE-SA Standards Board, "IEEE Standard for Local and Metropolitan Area Networks: Media Access Control (MAC) Security," Jun. 8, 2006 (154 pages).
Intel Corporation, "PHY Interface for the PCI Express, SATA, USB 3.1, DisplayPort, and Converged IO Architectures, Version 5.2," Pub Date 2007-2019 (166 pages).
PCI Express, "PCI Express, Base Specification, Revision 4.0, Version 1.0," Sep. 27, 2017 (1293 pages).
Trusted Computing Group Incorporated, "TCG Storage Security Subsystem Class: Opal, Specification Version 2.01, Revision 1.00," Aug. 5, 2015 (80 pages).

* cited by examiner

DATA RELEASE CONTROL BASED ON AUTHENTICATION AND LINK PROTECTION

RELATED APPLICATIONS

This application claims the benefit of priority to U.S. Provisional Patent Application Ser. No. 62/778,807, filed Dec. 12, 2018 and titled "PCI EXPRESS DEVICE DATA RELEASE CONTROL BASED ON PCI EXPRESS LINK PROTECTION AND AUTHENTICATION".

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

A processor may include or be coupled to logic that may couple two devices together via a link. For example, a processor may include an interconnect fabric architecture, such as a Peripheral Component Interconnect (PCI) Express (PCIe) architecture. A primary goal of PCIe is to enable various components and devices (e.g., from different vendors) to inter-operate in an open architecture, spanning multiple market segments.

DETAILED DESCRIPTION

Figure 1:
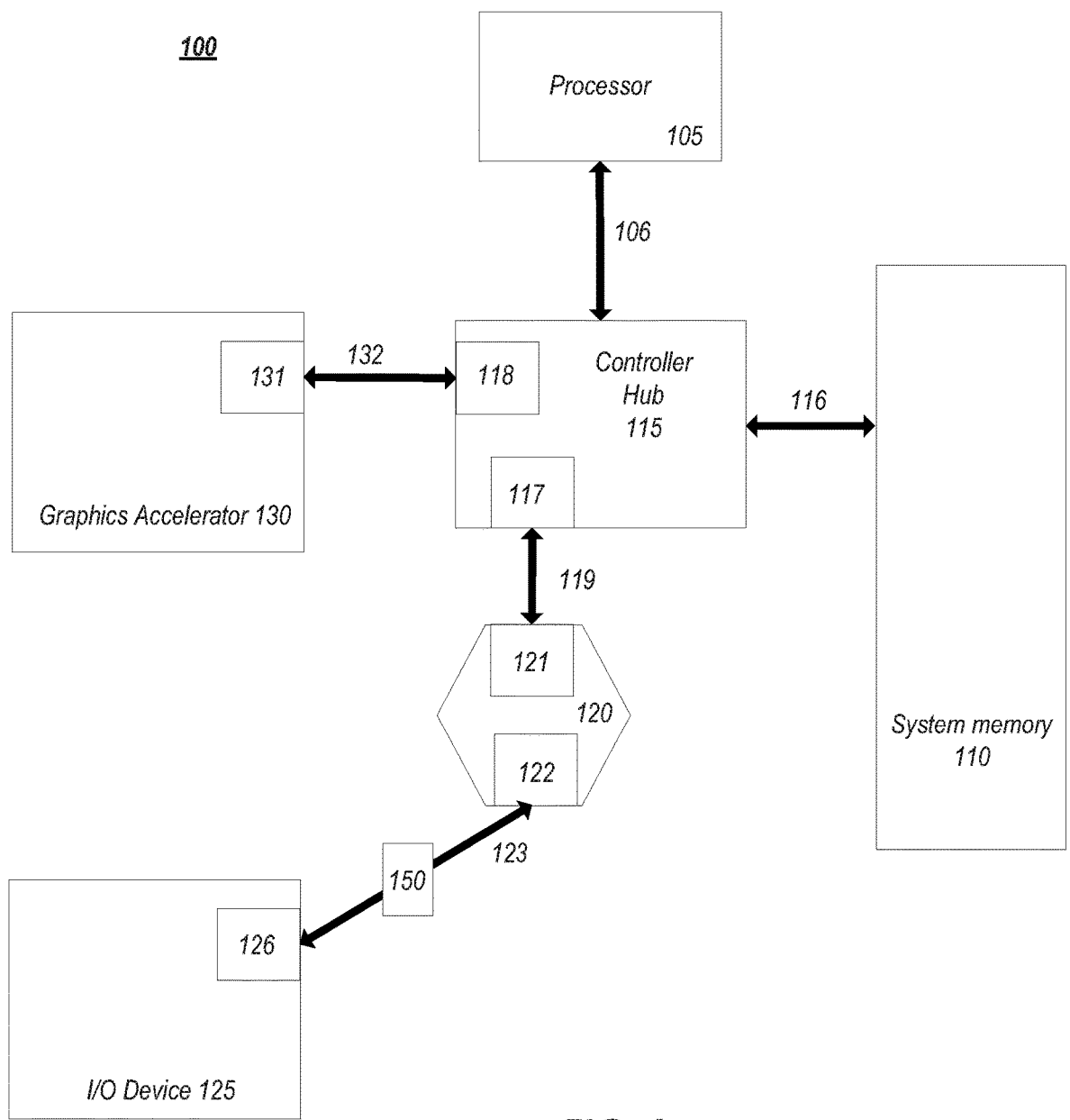
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice all embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the embodiments disclosed herein.

Although the following embodiments may be described with reference to computer security enhancements in specific computing systems, such as in computing platforms, storage devices, or microprocessors, other embodiments are applicable to other types of integrated circuits and logic devices. Similar techniques and teachings of embodiments described herein may be applied to other types of circuits or semiconductor devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from various embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through a link 106 (e.g., a front-side bus (FSB)). In one embodiment, link 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), volatile memory, non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through controller hub (e.g., root complex) 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, e.g., up a hierarchy towards a root complex, to controller hub 115 and downstream, e.g., down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, an accelerator, and other input/output devices. Often in the PCIe vernacular, such a device is referred to as an endpoint. Although not specifically shown, device 125 may include a PCIe to PCI/PCI-X bridge to support legacy or other version of PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
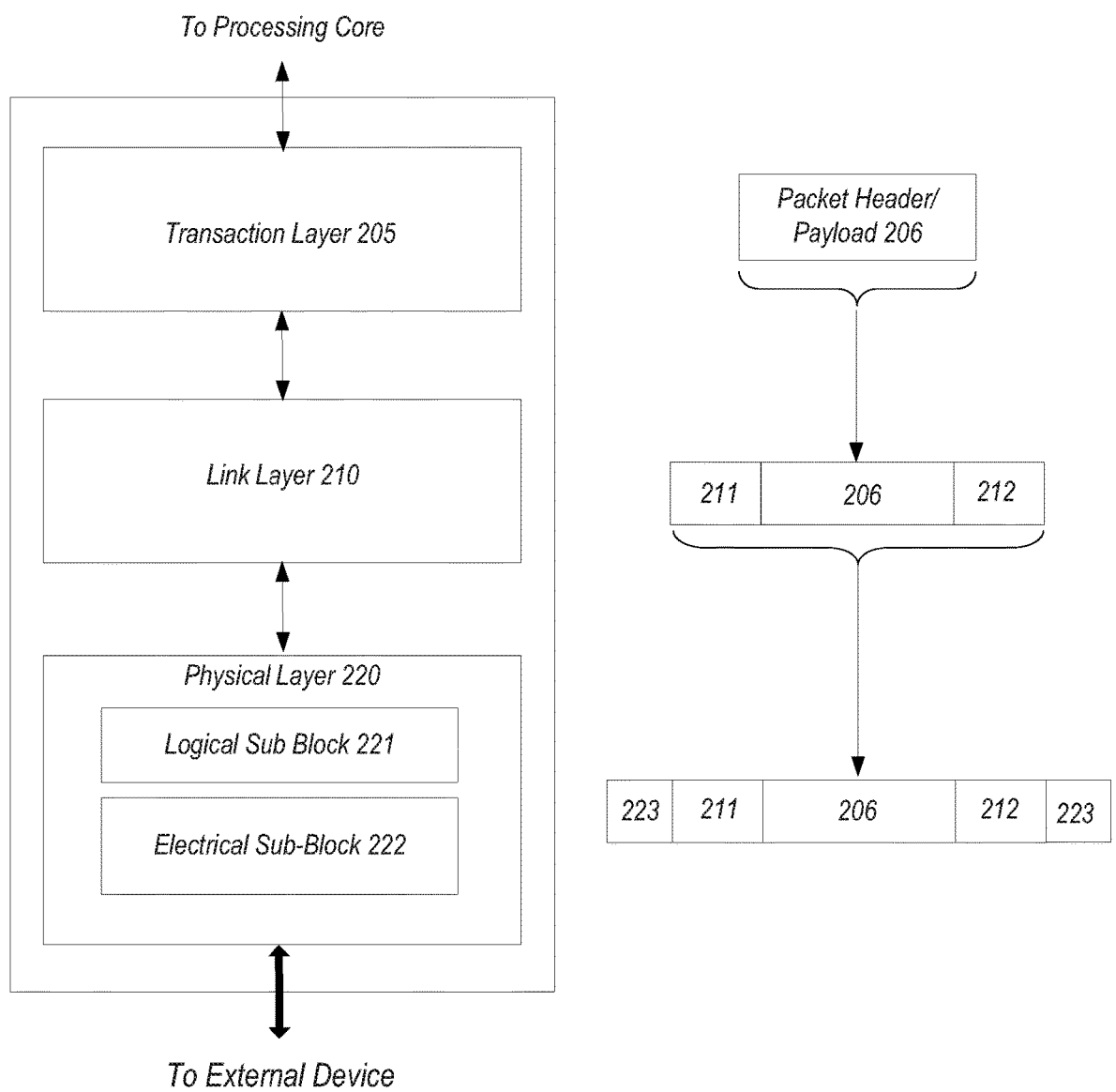
FIG. 2 illustrates an embodiment of an interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, e.g. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as a 64-bit address. Configuration space transactions are used to access configuration space of the PCIe devices. Transactions to the configuration space include read requests and write requests. Message space transactions (or, simply messages) are defined to support in-band communication between PCIe agents.

In one embodiment, transaction layer 205 assembles packet header/payload 206. Format for current packet headers/payloads may be found in the PCIe specification at the PCIe specification website (indeed any reference herein to a portion of the PCIe specification may contemplate any past, current, or future PCIe specification currently available or available in the future at the PCIe specification website or through other means).

Figure 3:
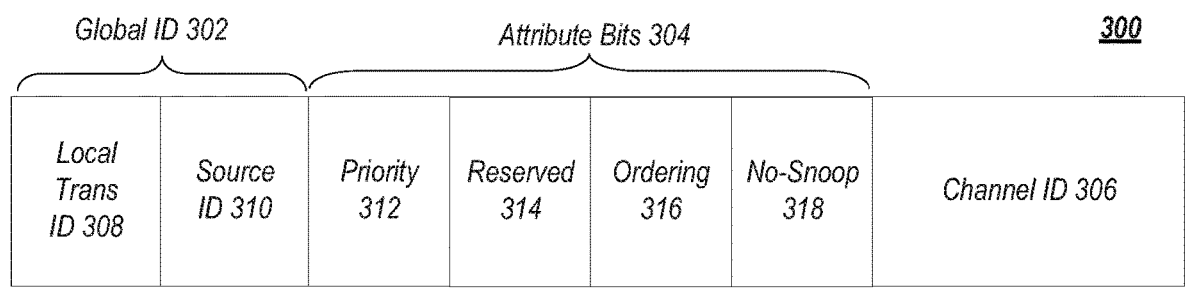
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components over a link. One side of the Data Link Layer 210 accepts TLPs assembled by the Transaction Layer 205, applies packet sequence identifier 211, e.g. an identification number or packet number, calculates and applies an error detection code, e.g. CRC 212, and submits the modified TLPs to the Physical Layer 220 for transmission across a physical medium to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
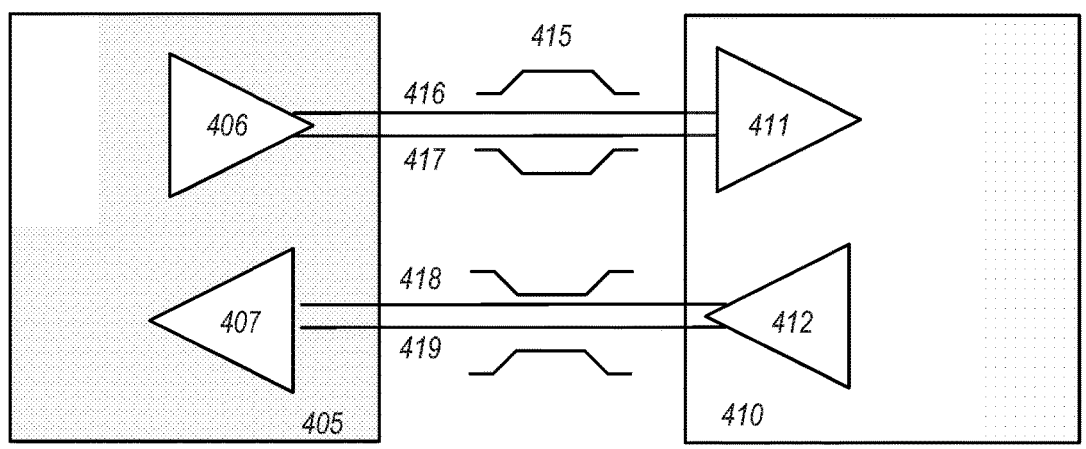
FIG. 4 illustrates an embodiment of a transmitter and receiver pair for an interconnect architecture.

Referring next to FIG. 4, an embodiment of a PCIe serial point-to-point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, e.g. paths 416 and 417, and two receiving paths, e.g. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, e.g. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Figure 5:
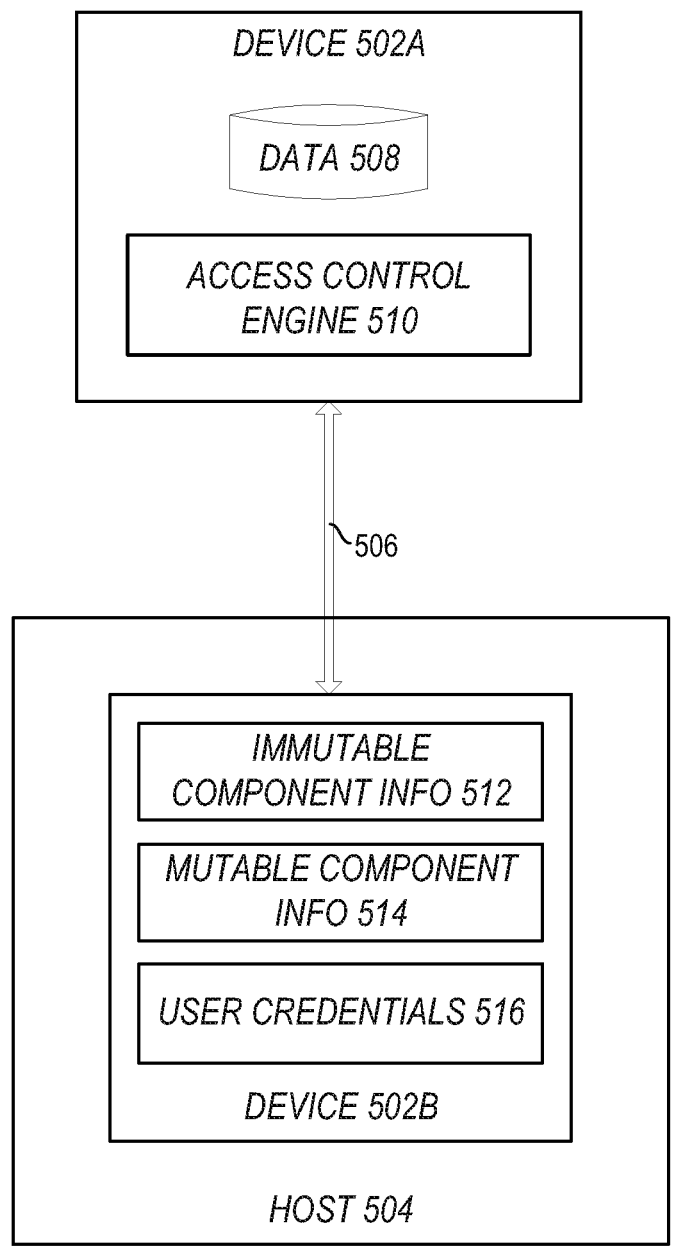
FIG. 5 illustrates a block diagram of a first device and second device coupled via a link in accordance with certain embodiments.

FIG. 5 illustrates a block diagram of a first device 502A and second device 502B coupled via a link 506 in accordance with certain embodiments. In a particular embodiment, the first device 502A and second device 502B are PCI Express endpoints (e.g., devices that may communicate in accordance with a PCI express protocol) and the link is a PCI express link that is physically protected (where a physically protected link may refer to a link between endpoints that have agreed upon at least one cryptographic key to be used to protect messages over the link).

The first device 502A may store protected data 508 that is subject to access control. For example, the protected data 508 may include user data, configuration data, or other private information. Access control engine 510 may comprise circuitry to monitor an authentication state of the second device 502B and a protection state of link 506 and to control access to data 508 based on the monitored states. In a particular embodiment, first device 502A is a storage device and at least a portion of data 508 is stored in an encrypted state.

In some systems, a storage device may release data to another hardware device over a link based on mere authentication of a user of the hardware device, regardless of whether the authentication is integrated inside the storage device or outside on another device (e.g., on a host computing machine). One common authentication mechanism includes password-based authentication to unlock a PCI Express device, in order for the PCI Express device to release data. However, an adversary with physical access to the data link between the first and the second device may compromise the secrecy, data confidentiality, and integrity of the data after the other device successfully authenticates to the PCI Express hardware device, and thus the data released over the link by the PCI Express hardware device may comprise unprotected data. Moreover, a password based scheme may prove to be an inadequate security mechanism.

In various embodiments of the present disclosure, device 502A enforces PCI Express device data release control implementing a policy based on both PCI Express data link protection and authentication. In some embodiments, the PCI Express data link protection may include one or more of confidentiality, replay, and integrity protection; and the authentication may include one or more of immutable component authentication, mutable component authentication, and user authentication. A data release control determination may be based on both the authentication results and the state of the data link protection. In an embodiment, if authentication fails or if the PCI Express link protection (e.g., confidentiality, integrity, replay protection or combination of these) is disabled, has encountered an error, or has been disrupted, the data 508 stored on the first PCI Express device 502A is not released on the data link 506 outside of the first device's physical boundary. In some embodiments, re-authentication and re-enablement of the data link protection must occur when either the first or the second device transitions its power state in a manner that disrupts the link protection or when the cryptographic material that is used to protect the link has been lost on either device.

Upon a detection that data 508 is not to be released over the link 506 outside of the device 502A due to authentication failure or link protection anomaly, the device 502A may either maintain the communication link 506 with the second device 502B and report the policy decision made on the first device (e.g., by causing one or more architectural registers of or associated with the first device 502A to be written to) or tear down the communication link with the second device. Responsive to determining that access to the data 508 is denied, the second device 502B may reinitiate the authentication and reestablish the PCI Express link protection with the first device 502A and again request release of data 508.

In an example usage scenario, a hardware device 502B embedded within or coupled to a host computing device 504 may write data 508 (e.g., secret information) into device 502A (e.g., a PCI Express encrypted storage device) that can be retrieved later. The device 502B first authenticates itself to the storage device 502A, including authentication of of the device 502B's operating environment (e.g., immutable component information 512 and/or mutable component information 514) and user credentials 516. The two devices 502A and 502B use the authentication results to set up PCI Express link protection, such that the data link 506 between the devices is considered private and protected. The device 502B can securely read the status of the link 506 and if that indicates that the security level is appropriate, it may then store secret information onto the device 502A. If and when the data link protection is disabled or disrupted, the device 502B shall re-authenticate its operating environment and re-enable the link protection, such that the device 502A may ensure that the secret information stored in data 508 is released to the same entity (e.g., user of device 502B) that stored the information and no adversary can compromise the confidentiality and integrity when the secret information travels on the link 506.

Various embodiments may offer certain technical advantages, such as strong mitigation against physical adversaries. In addition, various embodiments may improve privacy protections on various computing platforms by binding release of protected data to the security level of the PCIe link over which that data will be transported.

The first device 502A may be any suitable computing device to store protected data 508, authenticate a second computing device 502B, and communicate with the second computing device 502B over a secure link 506. As examples, first device 502A may comprise an encrypted storage device, a SmartNIC, an artificial intelligence (AI) accelerator, a graphics processing unit accelerator, or other suitable computing device.

The second device 502B may be any suitable computing device to request protected data 508, authenticate with a first computing device 502A, and communicate with the first computing device 502A over a secure link 506. For example, the second device 502B may be a host computing machine 504, a device on a host computing machine 504, a device coupled to device 502A through host computing machine 504, or other suitable device.

In various embodiments, device 502A and device 502B may communicate with each other in a manner compliant with a PCI express protocol, whether a current or future protocol. In other embodiments, device 502A and device 502B may be compliant with other suitable protocol that provides protection against physical link attacks. In some embodiments, the first and second devices may be two accelerators connected via the (e.g., PCIe) link or two host computing devices connected by the (e.g., PCIe) link.

Data 508 may comprise any suitable data. In various embodiments data 508 may include data of privacy concern, such as control or management data, or any general data that a user of the first device may store or provision on the first hardware device 502A. In various embodiments, all data persistently stored by the first device 502A (excluding particular types of data, e.g., data which must be shared across an unprotected link, such as data used to setup the protected link) may be deemed protected data and subject to access controls described herein. In one embodiment, all data stored by the device 502A on a particular memory device or drive of device 502A may be protected data. In another embodiment, data may be selectively tagged as protected data or stored in a location that stores protected data (e.g., based on an indication by the second device 502B that such data should be protected) and the non-protected data is not subject to the access controls described herein (or subject to a lesser degree of access control than the protected data).

As described above, multiple aspects of device 502B may be authenticated by the first device 502A prior to allowing access to data 508. For example, one or more of immutable component information 512, mutable component information 514, or user credentials 516 of the second device 502B may be authenticated by the first device 502A Immutable component information 512 may include information about hardware components of device 502B, such as a Device ID, a Vendor ID (e.g., an ID of the manufacturer of the device), an ID of an organization that owns or has certified the device 502B or a component of device 502B, an ID of a hardware component (e.g., microcontroller, logic circuit, memory, programmable fuse, etc.) of device 502B, or other suitable information regarding a hardware component of device 502B. In some embodiments, the immutable components information may indicate one or more capabilities of the hardware of device 502B, such as cryptographic capabilities for data communicated over the link.

Mutable components information 514 may include information about software and firmware installed on the device 502B. For example, such information may include a version number or vendor of software or firmware (e.g., firmware of a microcontroller) of device 502B. In particular embodiments, mutable components information 514 may include identifiers of static configuration data stored in non-volatile or volatile memory, bit streams for field programmable gate arrays (FPGAs), or any software running on the hardware device. In some embodiments, the mutable components information 514 may indicate one or more capabilities of the software of device 502B, such as cryptographic capabilities for data communicated over the link.

User credentials may include information to authenticate a user of the device 502B or a computing machine requesting the protected data through device 502B, such as a knowledge factor (e.g., username, password, pin number, etc.), possession factor (e.g., one-time password tokens or information received or otherwise derived from a key fob or other physical object), or biometric information (e.g., a fingerprint, facial image, etc.).

Figure 6:
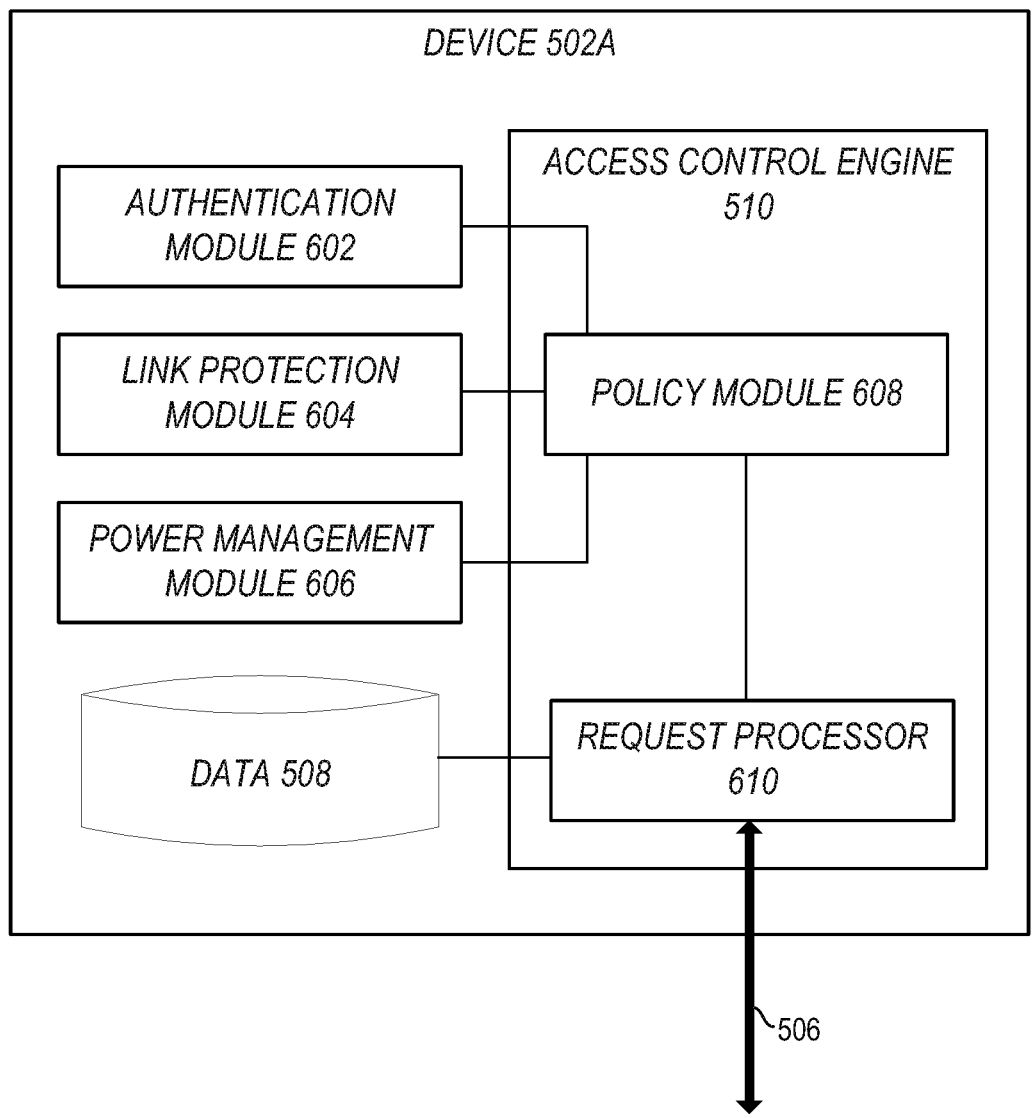
FIG. 6 illustrates a block diagram of a first device in accordance with certain embodiments.

FIG. 6 illustrates a block diagram of a first device 502A in accordance with certain embodiments. Device 502A includes data 508, access control engine 510, authentication module 602, link protection module 604, and power management module 606.

Authentication module 602 is to perform authentication functions. For example, authentication module 602 may access authentication information of the second device 502B and determine whether the authentication information of the second device matches expected authentication information. Authentication module 602 may perform a multi-phase authentication process, where multiple types of information associated with the second device is to be authenticated by the authentication module 602 before the device 502B is considered to have passed authentication. For example, the authentication module 602 may authenticate one or more of immutable component information 512, mutable component information 514, or user credentials 516, and if any of these authentications fail, may consider the authentication to have failed.

In various embodiments, the authentication module 602 may write the results of each authentication and/or the final authentication result (e.g., whether all types of authentication information tested passed) to one or more registers accessible to policy module 608 or may otherwise notify policy module 608 of the results of the authentication process.

Link protection module 604 may perform functions to set up physical link protection over link 506 (such as the functions described below). Various protections may be set up over the link independently or mutually. For example, a first link protection procedure may establish confidentiality protection for data transmitted over the link 506 between the first device 502A and the second device 502B, a second link protection procedure may establish replay attack protection for data transmitted over the link 506, and a third link protection procedure may establish integrity protection for data transmitted over the link 506. Integrity protection provides protection against the unauthorized modification of data within transmissions prior to reception. Replay attack protection protects against attacks in which a valid transmission across link 506 is captured and then maliciously repeated. Confidentiality protection provides protection (e.g., through encryption) against an unauthorized party obtaining access to private information conveyed by a transmission.

In one embodiment, in order to protect the traffic flowing through PCIe links against confidentiality and integrity attacks, an authenticated encryption scheme based on Advanced Encryption Standard operating in Galois/Counter Mode (AES-GCM) with 256-bit keys to encrypt/decrypt data on the link is used. In other embodiments, endpoints (e.g., PCIe Endpoints or other computing devices) may support additional key sizes (for example AES-128) or other suitable crypto-algorithms (e.g., stream ciphers suitable for encrypting communication channels including block ciphers operating in counter mode). Although various embodiments herein are discussed with reference to AES-GCM, such embodiments may be implemented using any suitable crypto-algorithms. In such cases, the endpoints may provide flexible and agile cryptography mechanisms including the ability to enumerate the cryptographic capabilities of the endpoints and may provide authenticated mechanisms to determine the status of the cryptographic algorithm selected.

When physical protection over a link is desired, a key exchange may be performed over the link by the endpoint devices. In one embodiment, key exchange is performed through logical PCIe Protection Management Entities. In some embodiments, this may involve utilization of an in-band register set (e.g., mailbox) mechanism for authentication & measurement procedures. In some embodiments, before the key exchange is performed, authentication of both immutable characteristics of the endpoint devices and mutable characteristics may be performed. Additionally, during this initialization process, support for encryption at both Upstream and Downstream Ports may be discovered. In one embodiment, the key exchange is performed as part of the authentication flow. In another embodiment, the key exchange is performed as a separate flow. Alternatively, an in-band messaging mechanism may be used, provided there is a way to securely establish the correspondence between the specific link and the out-of-band connection. Key exchange can also be done through hardware-driven means, for example by using PCIe Messages (e.g., Management Component Transport Protocol (MCTP) tunneling messages or messages with new formats designed specifically for this purpose). In this case, the key exchange may be triggered and managed by the setup/management mechanisms discussed below, which, in various embodiments, may operate partly or completely independently of software running on the endpoints. In various embodiments, the key exchange may be performed in any suitable implementation-specific manner. In a particular embodiment, the key exchange may result in a shared secret being established between the endpoints which will be used to create a key chain comprising multiple derived keys. The key exchange may provide confidentiality for the link as the data sent over the link may be encrypted based on the key(s) setup during the key exchange.

Figure 7:
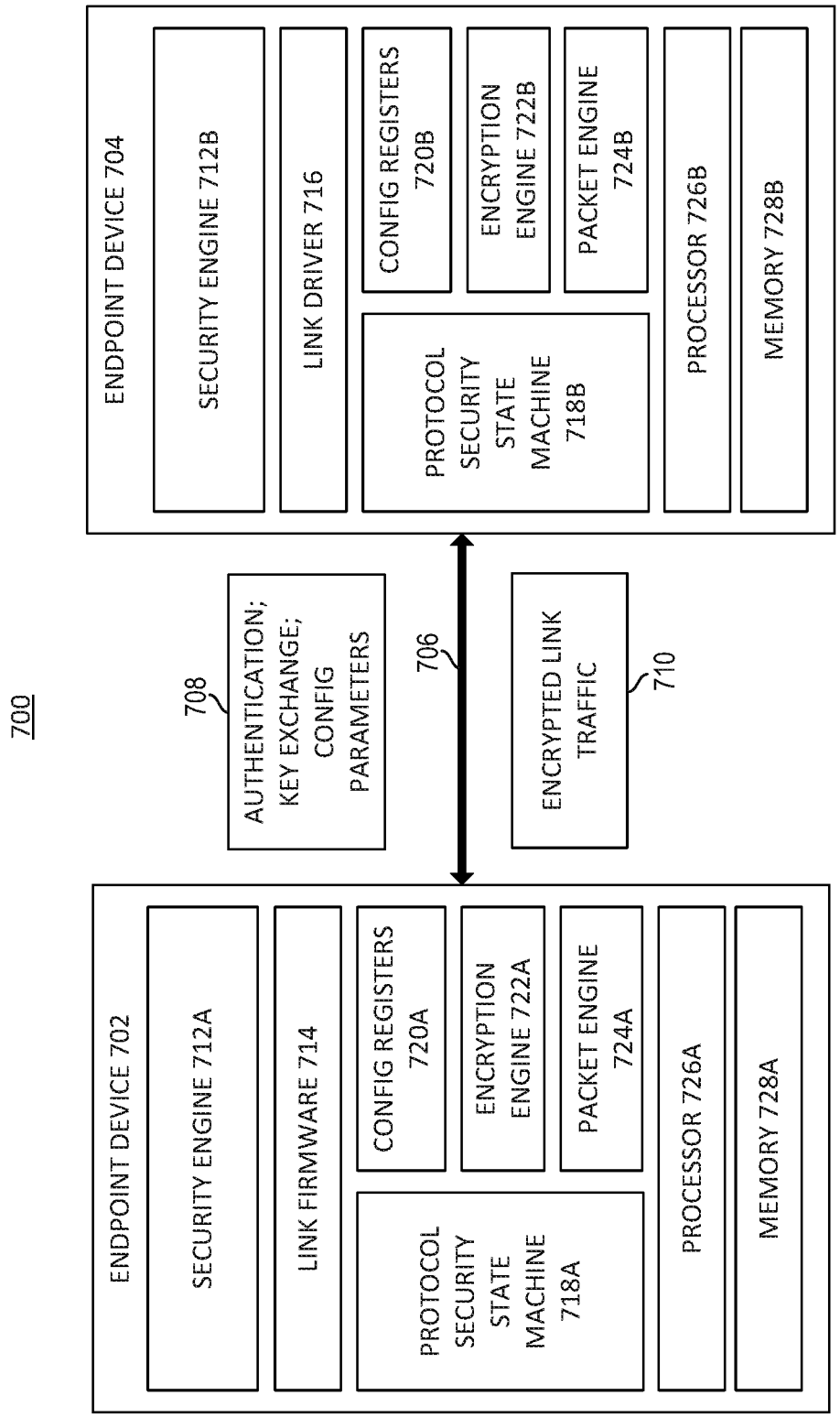
FIG. 7 illustrates a system for communicating encrypted data over a protected link in accordance with certain embodiments.

The setup of a physically protected link would start with a trigger, e.g., via a new control bit ("e.g., Link Encryption On") added to the Downstream Port. For example, a bit to indicate this trigger may be included in the Link Control 3 Register of the Secondary PCI Express Extended Capability Structure. In various embodiments, any of the reserved (RsvdP) bits (such as bit 2 as indicated in FIG. 7-69) of the Link Control 3 Register may be used as the control bit to trigger link protection. In other embodiments, any suitable message passed between the endpoints may trigger the configuration of a physically protected link.

Before triggering the setup, optional parameters such as the activation and configuration of the integrity protection may be communicated between link partners. For example, the size of an integrity check value (ICV) and, if the ICVs are not applied on a per TLP basis (i.e., if a single ICV is computed over multiple TLPs), the frequency/window of ICV application may be communicated. The ICV may provide integrity protection for the link.

Once triggered, the Downstream Port sends an "Initiate Secure Link" Message to the Upstream Port, and all TLP link traffic is blocked (e.g., by hardware) in both directions until the protected link has been established. If the key exchange has not already been performed at the time of the triggering, then the key exchange may be performed at this time. In various embodiments, the information associated with the key exchange may be communicated through a message-based mechanism. For example, a Message Request with data payload (MsgD) as defined in PCI Express may be used to carry the information associated with the key exchange in its payload. In various embodiments, the key exchange may be performed without software interaction.

Since run-time key exchange may be required depending on the implementation, in various embodiments it is desirable to support this message-based mechanism and to use the same mechanism for both the initial key exchange and all subsequent key exchanges. Once the initial key exchange has been completed, each Port transmits a "Secure Link Established" message to the other Port. This message may itself be encrypted (along with all subsequent link traffic). TLP traffic may then be unblocked and normal operation of the (now protected) link begins (or resumes if this process was performed to reestablish protection). The link key management protocols described herein may also be used for integrity protected synchronization of any protocol parameters, such as counters (e.g., initialization vectors used as part of the encryption scheme, such as in AES-GCM or other stream cipher suitable for protecting the link), other operational parameters identified herein, or other suitable protocol parameters. In various embodiments, counters that advance in a predetermined manner that are used (in associated with a particular cryptographic key) to encrypt and decrypt messages sent across the link may provide protection against replay attacks, as the same counter is not allowed to be used not be used twice and detection of a repeated counter value would indicate suspicious activity. Other suitable replay attack protections are contemplated herein.

If an attempt to establish an encrypted link fails (including, e.g., detection of any unexpected behavior observed in the handshake) the link is forced to a Disabled state until the trigger bit has been cleared. In an embodiment, clearing the "Link Encryption On" bit will set the "Link Disable" bit, and the link is constrained to remain in the Disabled state until the "Link Disable" bit is cleared to avoid attacks in which an adversary turns off link security. Additional error status information (e.g., describing an error encountered in the setup of the protected link) may be provided. In one example, such error status information may be included in the same mechanism as the trigger bit (e.g., the Link Status 3 Register).

Link protection module 604 may monitor the link protection state of link 506 and detect changes in the protection state of the link. In one embodiment, link protection module 506 may detect that link protection is disabled based on a detection of a link error associated with the authentication and verification of a packet sent over the link. For example, link protection module 604 may detect that link protection has been disabled based on a notification that a checksum (e.g., an ICV) of a message transmitted over the link is invalid (e.g., does not match a checksum calculated based on contents of the received message). In various embodiments, link protection module 604 may determine that link protection is disabled based on a detection of a link down or other link error (e.g., a link security fail error) associated with the communication protocol used over the link (e.g., PCIe protocol).

In various embodiments, the link protection module 604 may write the results of link protection procedures to one or more registers accessible to policy module 608 or may otherwise notify policy module 608 of the results of the link protection process. In various embodiments, the results may indicate which protections were set up on the link. For example, the results may indicate that confidentiality protection was established, but integrity and replay attack protections were not able to be established. As another example, the results may indicate that confidentiality, replay attack, and integrity protections were each established. In various embodiments, if the status of the link protection changes, the link protection module 604 may change the value of one or more registers accessible to policy module 608 or may otherwise notify policy module 608 of the change. For example, if one or more of the confidentiality protection, replay attack protection, or integrity protection is lost or otherwise compromised, the link protection module 604 may notify policy module 608.

In various embodiments, one or more registers may store values indicative of power state of the link, which information has been authenticated, or which protections are established on the link and such registers may be protected against unauthorized modification. For example, each of the registers may be configured so that only the device 502A or one or more components thereof (e.g., module 602, 604, 606, or 608) may edit such registers.

The power management module 606 may monitor a power state of link 506 and report the state (or changes to the state) to policy module 608. For example, when the power management module 606 determines that the link has transitioned from a normal state in which adequate protections can be maintained over the link 506 to a lower power state (e.g., in which one or more protections for the link are compromised), the power management module 606 may write an indication of the change of the link power state to one or more registers accessible to policy module 608 or may otherwise notify policy module 608 of the change in link power state. In some embodiments, with reference to the PCI Express protocol, such lower power states may include the $D3_{cold}$, L2, and L3 states, while normal/higher power states may include D0, D1, D2, and $D3_{hot}$ states. In various embodiments, if the link transitions back to the normal state, the power management module 606 may inform the policy module accordingly. In some embodiments, one or more of the link setup procedures may be performed again to establish adequate protections before access to data 508 is again permitted.

In the embodiment depicted, policy module 608 is coupled to authentication module 602, link protection module 604, and power management module 606. Policy module 608 analyzes information received from one or more of these modules to determine an authentication state of second device 502B and a link protection state of the link 506. In a particular embodiment, policy module 608 may determine whether the authentication state is sufficient to allow access to the data 508 and whether the link protection state is sufficient to allow access to the data 508. In some embodiments, the indication of whether the authentication state is sufficient is a binary indication and is positive only if all authentication requirements are met. Similarly, in some embodiments, the indication of whether the link protection state is sufficient is a binary indication and is positive only if each link protection type of a set of link protection types (e.g., confidentiality, replay attack, integrity) are currently in place.

The policy module 608 may report its decision on whether to allow access across the link 506 to data 508 in any suitable manner. For example, the policy module 608 may update a register with a value that indicates whether or not access to data 508 should be allowed. For example, architectural registers of the first device (e.g., registers in the PCI config space or MMIO space of the device) or any device-specific mechanisms may be used to report the decision.

In various embodiments, the indication of whether data 508 may be accessed may be reported (or otherwise made accessible) to any suitable entity, such as host computing device 504, device 502B, or request processor 610. In various embodiments, when the policy module 608 determines that access should not be allowed to data 508, the policy module 608 may initiate actions to restore authentication of device 502B and/or protection of link 506. For example, policy module 608 may cause a message to be sent to device 502B indicating that device 502B should re-authenticate with device 502A. As another example, policy module 608 may cause link set up procedures to be repeated so as to restore protections on link 506.

Request processor 610 receives requests for data 508 over link 506 and controls access to data 508 based on an indication from policy module 608 as to whether access should be granted. If the policy module 608 allows access, request processor 610 may retrieve the requested data and send the data over the protected link 506. If the policy module 608 does not allow access, request processor 610 may ignore the request, may respond with an error indicating that access is not allowed, or may take other appropriate action.

FIG. 7 illustrates a system 700 for communicating data (e.g., 508) over a protected link 506 in accordance with certain embodiments. System 700 includes and endpoint computing device 702 and an endpoint computing device 704 coupled via link 706. Device 702 may have any suitable characteristics of device 502A, device 704 may have any suitable characteristics of device 502B, and link 706 may have any suitable characteristics of link 506.

Each endpoint device includes a security engine 712, a protocol security state machine 718, configuration registers 720, encryption engine 722, packet engine 724, processor 726, and memory 728 (though each component is not necessarily the same at each endpoint). Endpoint device 702 includes link firmware 714 and endpoint 704 includes link driver 716. In some embodiments, endpoint 704 may be a host computing device, such as an SoC or other processing device.

In order to set up protection on the link 706, the endpoints 702 and 704 may, through their respective security engines 712, exchange various information 708, such as authentication data, cryptographic key information, and other configuration parameters. Once the link has been protected, packets may be generated by packet engines 724 (which in some embodiments may implement some or all of the protocol layers described herein), encrypted by encryption engines 722 to generate encrypted link traffic 710 which is then communicated between the endpoint 702 and endpoint 704.

In a particular embodiment, security engine 712A implements authentication module 602, link protection module 604, and access control engine 510 to protect data stored in memory 728A from transmission over an unprotected link.

Protocol layer logic may be provided (e.g., in one or more ports of the endpoint devices) to implement a link and stack of a particular protocol (e.g., PCIe, Gen-Z™, UPI, Cache Coherent Interconnect for Accelerators (CCIX™), Advanced Micro Device™'s (AMD™) Infinity™, Common Communication Interface (CCI), Qualcomm™'s Centriq™' etc.) over link 706.

In some examples, the device 704 may be integrated with a host computing device, and/or the device may have its own computing capability with local firmware/software independent of the host, and/or a single processor may be operating on behalf of a complex device that is exposed through multiple functions (e.g., a switch) and/or even multiple logical devices (e.g. a switch with one or more additional devices logically appearing below the switch, among other example implementations).

Encryption engines 722A and 722B may include hardware circuitry, firmware, and/or software to perform cryptographic operations and other tasks relating to management and use of certificates and corresponding cryptographic keys (e.g., the decryption and encryption of signed manifest, verification of hashes, and other cryptographic tasks) in connection with authentication and verification tasks performed in an example device authentication architecture.

In some implementations, such as in the example of a PCIe device, a set of registers (e.g., 720) may be provided on each of the devices and the registers may be populated and read (e.g., using an authentication engine) to allow the communication of messages or instructions with the other device in an authentication architecture. In one example, the registers 720 may include registers defined and provisioned on the devices as extended capability registers under PCIe. For instance, the registers 720 may include registers to indicate characteristics of the respective device, including its model, vendor, the authentication protocols it supports, the cryptographic technologies it supports, to indicate its certificate authority (e.g., associated with a certificate and private key), and other features of the device.

Figure 8:
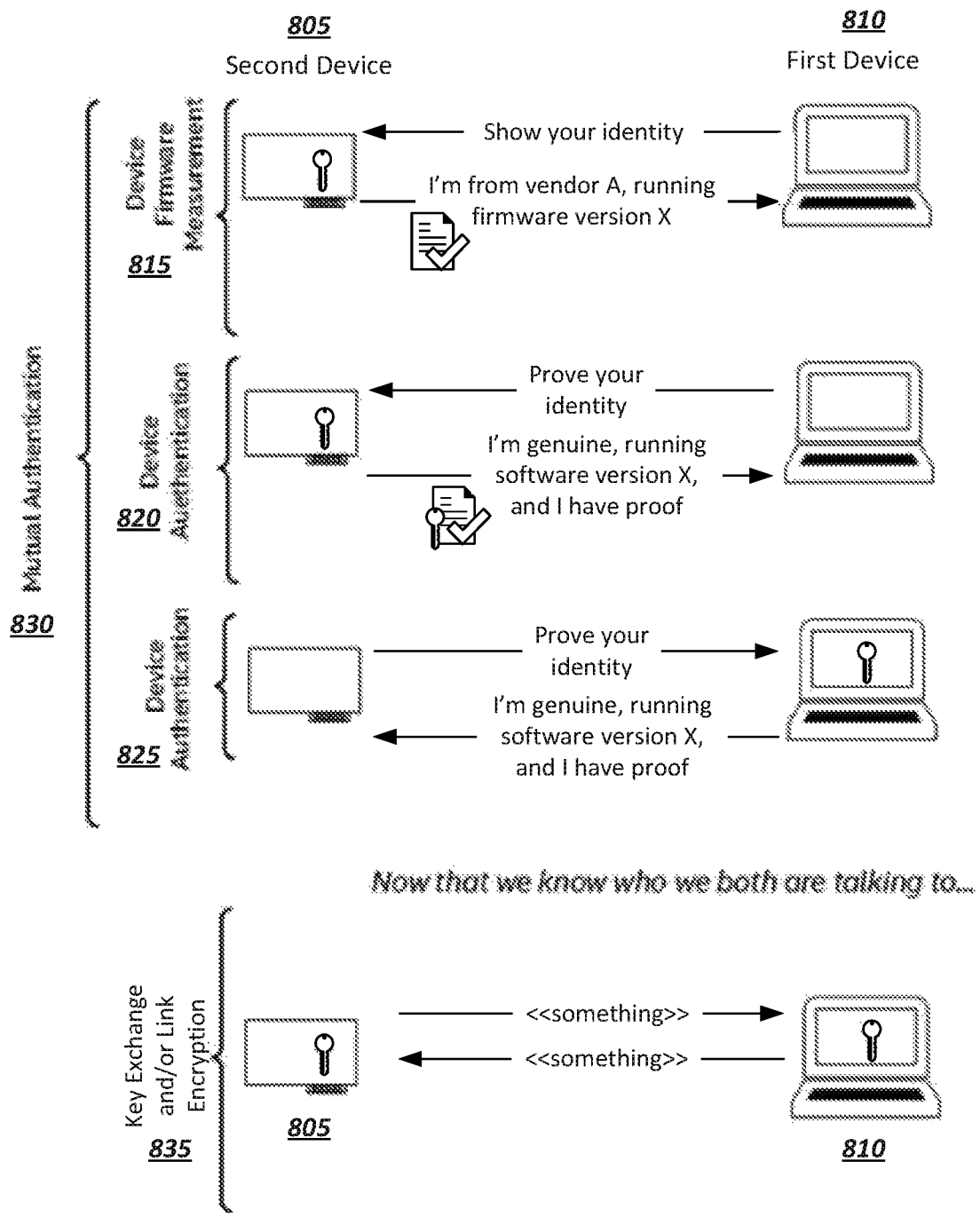
FIG. 8 illustrates a flow for device authentication in accordance with certain embodiments.

FIG. 8 illustrates a flow for device authentication in accordance with certain embodiments. A second device 805 (which may have any characteristics of second device 502B or 704), such as a PCIe device, may be connected to a first device 810 (which may have any characteristics of first device 502A or 704) (e.g., via a port). Before granting access to certain host resources (e.g., data 508), the first device may first utilize an authentication architecture to ensure that the second device is of a particular type, from a particular manufacture, has particular characteristics, is certified, endorsed, or owned by a particular organization, or other suitable checks before applying certain policies to the second device 805's interaction with the first device 810. For instance, the first device 810 can query the second device 805's firmware version through a firmware measurement. The first device 810 can also query a second device's hardware and firmware through device authentication 520. The second device 805, in some implementations, may likewise query the first device's identity (e.g., through authentication 820). In some cases, mutual authentication 830 may be achieved through device authentications 820 and 825. After verifying identity (and capabilities, when desired), the devices can exchange secrets (e.g., at 835) for link encryption or other security purposes through key exchange. As illustrated in the example of FIG. 8, device authentication may be utilized to allow trust decisions to be made between devices via an interconnect (e.g., a PCIe-compliant interconnect). In some implementations, device firmware measurement may be utilized in connection with device authentication to enable the trustworthiness of the device authentication.

In some implementations, device authentication (e.g., 820) may borrow from existing authentication schemes, protocols, and paradigms. In one example, a PCIe device authentication scheme may borrow from and at least partially follow the authentication architecture of a different interconnect protocol. For instance, at least a portion of the authentication scheme set forth in the Universal Serial Bus (USB) Authentication Specification may be utilized during authentication of the PCIe device (over PCIe registers and links). For instance, principles and flows defined in the Authentication Architecture, Authentication Protocol and Authentication Messages of the USB Authentication Specification may be used. Leveraging existing authentication schemes (e.g., of other interconnects) may be beneficial, for instance, because the same software implementation can be used for both authentication in not only the intended protocol, but other protocols (e.g., both USB and PCIe Device Authentication), the same silicon hardware implementation block can be used for authentication of multiple protocols (e.g., for both USB and PCIe devices), among other example benefits.

Figure 9:
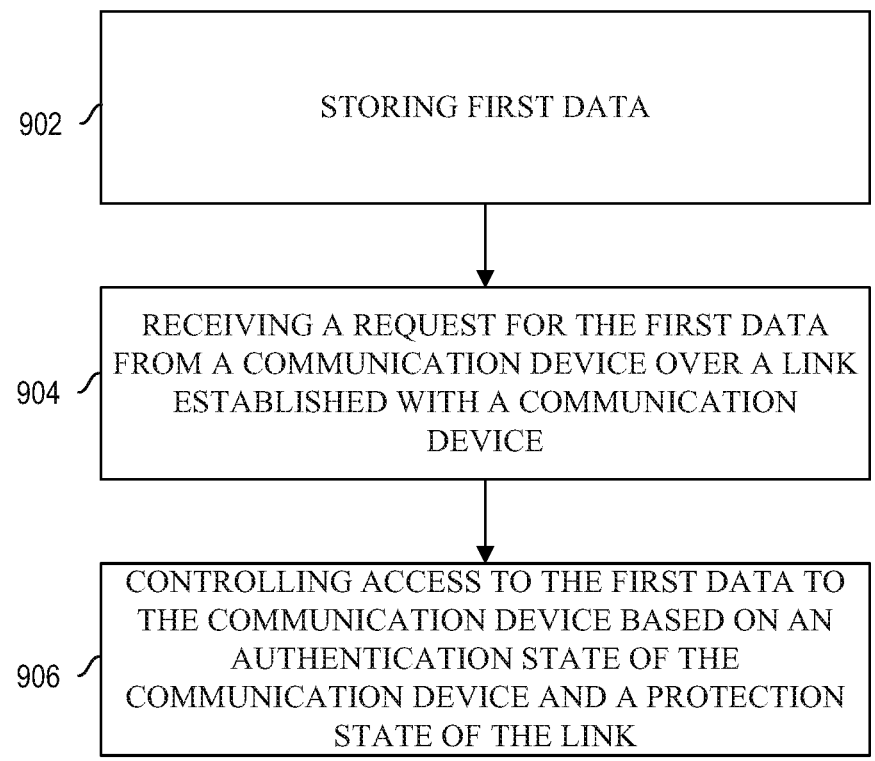
FIG. 9 illustrates a flow for data release control based on authentication and link protection in accordance with certain embodiments.

FIG. 9 illustrates a flow for data release control based on authentication and link protection in accordance with certain embodiments. The flow of FIG. 9 may be executed by a computing device, such as 502A 702, or other suitable computing device.

902 includes storing first data. 904 includes receiving a request for the first data from a communication device (e.g., any suitable computing device operable to communicate data with another computing device) over a link established with a communication device. 906 includes controlling access to the first data to the communication device based on an authentication state of the communication device and a protection state of the link.

Some of the blocks illustrated in FIG. 9 may be repeated, combined, modified or deleted where appropriate, and additional blocks may also be added to the flowchart. Additionally, blocks may be performed in any suitable order without departing from the scope of particular embodiments.

While some of the embodiments discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatuses, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures. For instance, first and second computing devices may be implemented, which are equipped with functionality to implement authentication, link protection, and data access control architectures as discussed in the examples above, in any one of a variety of computing architectures (e.g., using any one of a variety of different interconnects or fabrics). For instance, the devices may communicate within a personal computing system (e.g., implemented in a laptop, desktop, mobile, smartphone, Internet of Things (IoT) device, smart appliance, gaming console, media console, etc.). In another example, the devices may communicate within a server computing system (e.g., a rack server, blade server, tower server, rack scale server architecture or other disaggregated server architecture), among other examples.

Figure 10:
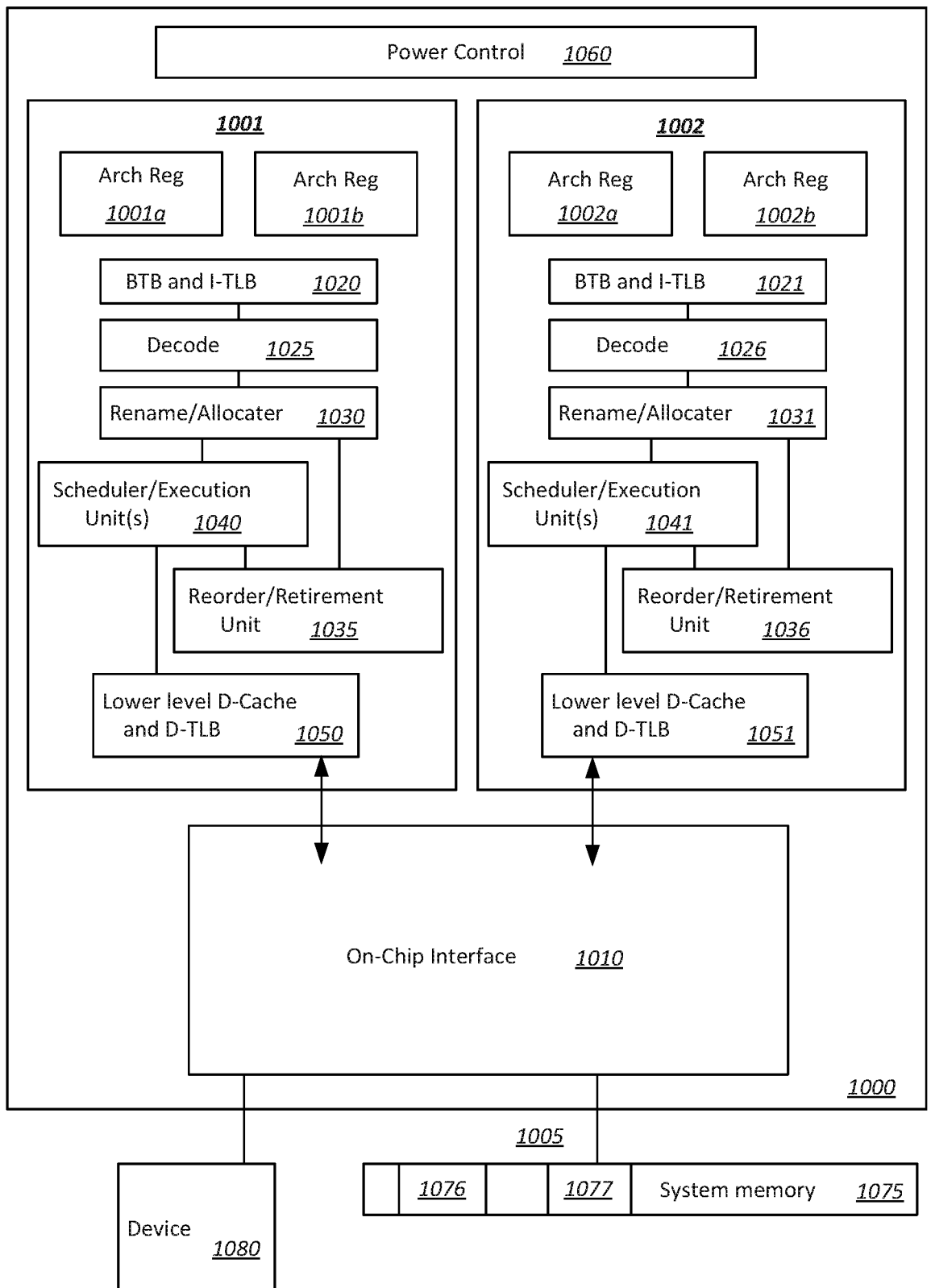
FIG. 10 illustrates a block diagram for a computing system including a multicore processor in accordance with certain embodiments.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, e.g. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (e.g. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, e.g., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001*a* and 1001*b* are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (e.g. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, e.g. generally where syntactic processing, semantic processing, and some transformation/optimization may take place, and (2) a back-end, e.g. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
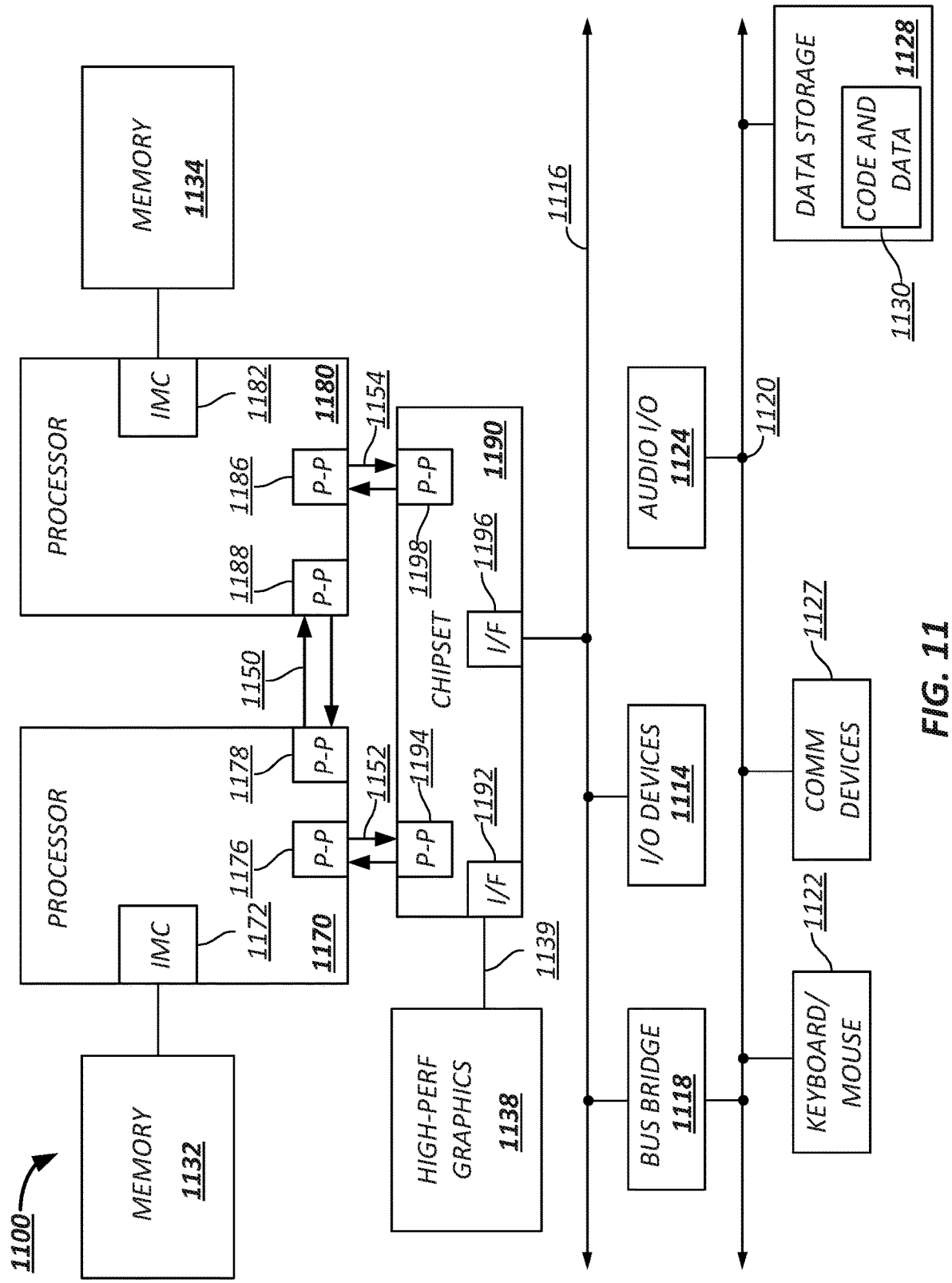
FIG. 11 illustrates a block diagram of a computing system including multiple processors in accordance with certain embodiments.

Referring now to FIG. 11, shown is a block diagram of another system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as a high-performance architecture. As a result, the invention may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module or engine as used herein refers to any combination of hardware, software, and/or firmware. As an example, a module or engine includes hardware, such as a micro-controller, associated with a non-transitory medium to store code adapted to be executed by the micro-controller. Therefore, reference to a module or engine, in one embodiment, refers to the hardware, which is specifically configured to recognize and/or execute the code to be held on a non-transitory medium. Furthermore, in another embodiment, use of a module or engine refers to the non-transitory medium including the code, which is specifically adapted to be executed by the microcontroller to perform predetermined operations. And as can be inferred, in yet another embodiment, the term module or engine (in this example) may refer to the combination of the microcontroller and the non-transitory medium. Often module or engine boundaries that are illustrated as separate commonly vary and potentially overlap. For example, a first and a second module or engine may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including a memory to store first data and an access control engine comprising circuitry. The access control engine is to receive a request for the first data from a communication device over a link established with the communication device; and control access to the first data to the communication device based on an authentication state of the communication device and a protection state of the link.

Example 2 may include the subject matter of example 1, wherein the access control engine is to block access to the first data to the communication device responsive to a determination that the protection state of the link indicates that one or more of confidentiality, replay, and integrity protections are not enabled for the link.

Example 3 may include the subject matter of example 1, wherein the access control engine is to provide access to the first data to the communication device responsive to a determination that the protection state of the link indicates that confidentiality, replay, and integrity protections are enabled for the link.

Example 4 may include the subject matter of any one of examples 1-3, wherein the authentication state indicates whether immutable components of the communication device have been authenticated.

Example 5 may include the subject matter of any one of examples 1-4, wherein the authentication state indicates whether mutable components of the communication device have been authenticated.

Example 6 may include the subject matter of any one of examples 1-5, wherein the authentication state indicates whether credentials of a user associated with the first data have been authenticated.

Example 7 may include the subject matter of any one of examples 1-6, wherein the access control engine is to control access to the first data to the communication device based on the authentication state and the protection state of the link responsive to a determination that the first data is to be protected.

Example 8 may include the subject matter of any one of examples 1-7, wherein the access control engine is to provide access to second data over the link to the communication device without checking the protection state of the link responsive to a determination that the data is not protected.

Example 9 may include the subject matter of any one of examples 1-8, wherein, upon a determination that the protection state of the link has degraded, the access control engine is to deny access to the first data over the link to the communication device until the protection state of the link is restored.

Example 10 may include the subject matter of example 9, wherein the determination that the protection state of the link has degraded is made responsive to a notification that the link is to transition to a low power state.

Example 11 may include the subject matter of example 9, wherein the determination that the protection state of the link has degraded is made responsive to a notification that a checksum of a message transmitted over the link is invalid.

Example 12 may include the subject matter of example 9, wherein responsive to the determination that the protection state of the link has degraded, the access control engine is to deny access to the first data over the link until authentication is performed again.

Example 13 may include the subject matter of any one of examples 1-12, wherein responsive to a determination that the authentication state or the protection state of the link is insufficient to provide access to the first data, the access control engine is to cause a register accessible by the communication device to be written to, the register to indicate that the first data is inaccessible over the link.

Example 14 may include the subject matter of any one of examples 1-13, wherein responsive to a determination that the authentication state or the protection state of the link is insufficient to provide access to the first data, the apparatus is to tear down the link.

Example 15 may include the subject matter of any one of examples 1-14, further comprising a host computing device and the second communication device.

Example 16 is a method comprising storing first data; receiving a request for the first data from a communication device over a link established with a communication device; and controlling, by an access control engine comprising circuitry, access to the first data to the communication device based on an authentication state of the communication device and a protection state of the link.

Example 17 may include the subject matter of example 16, wherein controlling access to the first data comprises blocking access to the first data to the communication device responsive to a determination that the protection state of the link indicates that one or more of confidentiality, replay, and integrity protections are not enabled for the link.

Example 18 may include the subject matter of example 16, wherein controlling access to the first data comprises providing access to the first data to the communication device responsive to a determination that the protection state of the link indicates that confidentiality, replay, and integrity protections are enabled for the link.

Example 19 may include the subject matter of any one of examples 16-18, wherein the authentication state indicates whether immutable components of the communication device have been authenticated.

Example 20 may include the subject matter of any one of examples 16-19, wherein the authentication state indicates whether mutable components of the communication device have been authenticated.

Example 21 may include the subject matter of any one of examples 16-20, wherein the authentication state indicates whether credentials of a user associated with the first data have been authenticated.

Example 22 may include the subject matter of any one of examples 16-21, further comprising controlling access to the first data to the communication device based on the authentication state and the protection state of the link responsive to a determination that the first data is to be protected.

Example 23 may include the subject matter of any one of examples 16-22, further comprising providing access to second data over the link to the communication device without checking the protection state of the link responsive to a determination that the data is not protected.

Example 24 may include the subject matter of any one of examples 16-23, further comprising, responsive to a determination that the protection state of the link has degraded, denying access to the first data over the link to the communication device until the protection state of the link is restored.

Example 25 may include the subject matter of example 24, wherein the determination that the protection state of the link has degraded is made responsive to a notification that the link is to transition to a low power state.

Example 26 may include the subject matter of example 24, wherein the determination that the protection state of the link has degraded is made responsive to a notification that a checksum of a message transmitted over the link is invalid.

Example 27 may include the subject matter of example 24, wherein responsive to the determination that the protection state of the link has degraded, the access control engine is to deny access to the first data over the link until authentication is performed again.

Example 28 may include the subject matter of any one of examples 16-27, further comprising, responsive to a determination that the authentication state or the protection state of the link is insufficient to provide access to the first data, causing a register accessible by the communication device to be written to, the register to indicate that the first data is inaccessible over the link.

Example 29 may include the subject matter of any one of examples 16-28, further comprising, responsive to a determination that the authentication state or the protection state of the link is insufficient to provide access to the first data, tearing down the link.

Example 30 is at least one non-transitory machine accessible storage medium having instructions stored thereon, the instructions when executed on a machine, cause the machine to store first data; receive a request for the first data from a communication device over a link established with a communication device; and control access to the first data to the communication device based on an authentication state of the communication device and a protection state of the link.

Example 31 may include the subject matter of example 30, wherein controlling access to the first data comprises blocking access to the first data to the communication device responsive to a determination that the protection state of the link indicates that one or more of confidentiality, replay, and integrity protections are not enabled for the link.

Example 32 may include the subject matter of example 30, wherein controlling access to the first data comprises providing access to the first data to the communication device responsive to a determination that the protection state of the link indicates that confidentiality, replay, and integrity protections are enabled for the link.

Example 33 may include the subject matter of any one of examples 30-32, wherein the authentication state indicates whether immutable components of the communication device have been authenticated.

Example 34 may include the subject matter of any one of examples 30-33, wherein the authentication state indicates whether mutable components of the communication device have been authenticated.

Example 35 may include the subject matter of any one of examples 30-34, wherein the authentication state indicates whether credentials of a user associated with the first data have been authenticated.

Example 36 may include the subject matter of any one of examples 30-35, further comprising controlling access to the first data to the communication device based on the authentication state and the protection state of the link responsive to a determination that the first data is to be protected.

Example 37 may include the subject matter of any one of examples 30-36, further comprising providing access to second data over the link to the communication device without checking the protection state of the link responsive to a determination that the data is not protected.

Example 38 may include the subject matter of any one of examples 30-37, further comprising, responsive to a determination that the protection state of the link has degraded, denying access to the first data over the link to the communication device until the protection state of the link is restored.

Example 39 may include the subject matter of example 38, wherein the determination that the protection state of the link has degraded is made responsive to a notification that the link is to transition to a low power state.

Example 40 may include the subject matter of example 38, wherein the determination that the protection state of the link has degraded is made responsive to a notification that a checksum of a message transmitted over the link is invalid.

Example 41 may include the subject matter of example 38, wherein responsive to the determination that the protection state of the link has degraded, the access control engine is to deny access to the first data over the link until authentication is performed again.

Example 42 may include the subject matter of any one of examples 30-41, further comprising, responsive to a determination that the authentication state or the protection state of the link is insufficient to provide access to the first data, causing a register accessible by the communication device to be written to, the register to indicate that the first data is inaccessible over the link.

Example 43 may include the subject matter of any one of examples 30-42, further comprising, responsive to a determination that the authentication state or the protection state of the link is insufficient to provide access to the first data, tearing down the link.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a memory to store first data; and
   an access control engine comprising circuitry, the access control engine to:
      receive a request for the first data from a communication device over a link established with the communication device;
      control access to the first data to the communication device based on an authentication state of the communication device and a protection state of the link; and
      provide access to the first data to the communication device responsive to a determination that the protection state of the link indicates that confidentiality, replay, and integrity protections are enabled for the link;
   wherein the link is a Peripheral Component Interconnect Express (PCIe) link and the apparatus and the communication device comprise PCIe endpoints to communicate over the PCIe link.

2. The apparatus of claim 1, wherein the access control engine is to block access to the first data to the communication device responsive to a determination that the protection state of the link indicates that one or more of confidentiality, replay, and integrity protections are not enabled for the link.

3. The apparatus of claim 1, wherein the authentication state indicates whether immutable components of the communication device have been authenticated.

4. The apparatus of claim 1, wherein the authentication state indicates whether mutable components of the communication device have been authenticated.

5. The apparatus of claim 1, wherein the authentication state indicates whether credentials of a user associated with the first data have been authenticated.

6. The apparatus of claim 1, wherein the access control engine is to control access to the first data to the communication device based on the authentication state and the protection state of the link responsive to a determination that the first data is to be protected.

7. The apparatus of claim 6, wherein the access control engine is to provide access to second data over the link to the communication device without checking the protection state of the link responsive to a determination that the data is not protected.

8. The apparatus of claim 1, wherein, upon a determination that the protection state of the link has degraded, the access control engine is to deny access to the first data over the link to the communication device until the protection state of the link is restored.

9. The apparatus of claim 8, wherein the determination that the protection state of the link has degraded is made responsive to a notification that the link is to transition to a low power state.

10. The apparatus of claim 8, wherein the determination that the protection state of the link has degraded is made responsive to a notification that a checksum of a message transmitted over the link is invalid.

11. The apparatus of claim 8, wherein responsive to the determination that the protection state of the link has degraded, the access control engine is to deny access to the first data over the link until authentication is performed again.

12. The apparatus of claim 1, wherein responsive to a determination that the authentication state or the protection state of the link is insufficient to provide access to the first data, the access control engine is to cause a register accessible by the communication device to be written to, the register to indicate that the first data is inaccessible over the link.

13. The apparatus of claim 1, wherein responsive to a determination that the authentication state or the protection state of the link is insufficient to provide access to the first data, the apparatus is to tear down the link.

14. The apparatus of claim 1, further comprising a host computing device and the second communication device.

15. A method comprising:
storing first data;
receiving, by a first Peripheral Component Interconnect Express (PCIe) endpoint, a request for the first data from a second PCIe endpoint over a PCIe link established with the second PCIe endpoint;
controlling, by an access control engine comprising circuitry, access to the first data to the second PCIe endpoint based on an authentication state of the second PCIe endpoint and a protection state of the link; and
providing access to the first data to the communication device responsive to a determination that the protection state of the link indicates that confidentiality, replay, and integrity protections are enabled for the link.

16. At least one non-transitory machine accessible storage medium having instructions stored thereon, the instructions when executed on a machine, cause the machine to:
store first data;
receive a request for the first data from a communication device over a link established with a communication device; and
control access to the first data to the communication device based on an authentication state of the communication device and a protection state of the link, wherein the link is a Peripheral Component Interconnect Express (PCIe) link and the machine and the communication device comprise PCIe endpoints to communicate over the link, wherein controlling access to the first data comprises providing access to the first data to the communication device responsive to a determination that the protection state of the link indicates that confidentiality, replay, and integrity protections are enabled for the link.

17. The storage medium of claim 16, wherein controlling access to the first data comprises blocking access to the first data to the communication device responsive to a determination that the protection state of the link indicates that one or more of confidentiality, replay, and integrity protections are not enabled for the link.

* * * * *